United States Patent [19]

Hannon, Jr.

[11] Patent Number: 4,974,813
[45] Date of Patent: Dec. 4, 1990

[54] MOLD FILL COUPLING

[75] Inventor: John L. Hannon, Jr., Amherst, N.Y.

[73] Assignee: E. I. du Pont de Nemours and Company, Wilmington, Del.

[21] Appl. No.: 515,140

[22] Filed: Apr. 26, 1990

Related U.S. Application Data

[62] Division of Ser. No. 458,468, Dec. 28, 1989.

[51] Int. Cl.$^5$ .............................................. F16K 5/06
[52] U.S. Cl. ..................................... 251/352; 425/146; 425/589
[58] Field of Search ....................... 251/349, 350, 352; 425/146, 564, 589

[56] References Cited

U.S. PATENT DOCUMENTS 1,914,736  6/1933  Couter ............................ 251/352 X
3,079,942  3/1963  Nelson ........................... 251/352 X

FOREIGN PATENT DOCUMENTS

327547  8/1935  Italy ..................................... 251/352

Primary Examiner—John C. Fox
Attorney, Agent, or Firm—Richard H. Burgess

[57] ABSTRACT

A mold fill coupling combined with a pinch fill valve and an overflow valve permits filling of a mold at one station and disconnecting the fill valve without rotating the mold.

1 Claim, 8 Drawing Sheets

MOLD FILL COUPLING

This is a division of application Ser. No. 07/458,468, filed Dec. 28, 1989.

BACKGROUND OF THE INVENTION

The invention relates to a coupling to permit filling and sealing of a pressurizable casting mold with a flowable polymer, the polymer being delivered through a nozzle which is inserted into a port on the mold. In such a coupling, the nozzle relates to pinch valves and the port relates to spherical closure valves. The coupling is useful with the mold fill system generally disclosed in U.K. No. 2,052,359 where an undefined closure element provides pressure-tight access to a casting runner. Such a system generally requires significant manual effort to use. Timely cleaning is required during the filling process.

It is sometimes desirable to fill such a mold from the bottom to facilitate removal of air from the mold during filling. With such a coupling as in U.K. No. 2,052,359, the mold must be reoriented so the port is above the fluid level before the nozzle is removed and the port capped, otherwise, the flowable fluid would run out of the mold.

Pinch valves of a type that may be useful in a coupling nozzle are known. U.S. Pat. No. 4,268,005 features a pressure-closable elastomeric sleeve inside an outer sleeve. The construction of such a valve is especially adapted for use with large size ducts and conduits of 8 to 12 feet in diameter. Such a valve, even if it could be scaled down to be suitably incorporated into an inch-scale diameter nozzle, requires an internal ring to retain and seal the elastomeric sleeve to the housing; such a ring restricts flow of fluid through the sleeve and creates stagnant flow areas for the fluid.

U.S. Pat. No. 3,982,723 discloses a pinch valve of simple construction where a thin wall flexible tube is folded back over the end of a tubular housing. End tubes are passed over the folded end and compressed by external clamps to retain and seal the flexible tube to the housing. Conduits are inserted at the ends of the valve and are held by the compressed end tubes. The external clamps on the tube ends would prevent insertion of the complete end of the valve into a close fitting hole.

Spherical closure elements useful in a coupling are known. U.S. Pat. No. 1,043,451 provides a door or closure on a boiler which can be opened and closed readily and will permit the free introduction of a nozzle without permitting the escape of fluids that pass into the boiler while the nozzle is in place in the closure. This is achieved by providing, at an opening into the boiler, a spherical bearing or support and mounting therein a spherical closure which has through it an aperture to permit the passage of the nozzle. The spherical closure can be turned, when the nozzle is removed, so as to close the aperture completely. The nozzle must be removed completely before the closure can be turned to close the aperture. During the time the nozzle is removed and before closing the aperture, any pressurized fluid in the boiler, such as would be the case where the aperture is located at the bottom of the boiler, can escape through the aperture, which is undesirable. The spherical closure of U.S. Pat. No. 1,043,451 also must have a projecting pin by which it can be turned to expose or conceal the aperture. This pin and the nozzle must be separately engaged, such as by an operator, to effect the closure; the nozzle to be removed and the pin to turn the spherical element. This complicates automation of the nozzle and closure handling.

SUMMARY OF THE INVENTION

The invention provides an improved pinch valve and shut-off valve and a new combination of a pinch valve and shut-off valve defining a fluid handling coupling that provides an improved means to fill and seal a pressurized mold. The coupling can be readily adapted to automatic operation. The coupling elements are simple to fabricate and assemble and can be easily cleaned The coupling consists of a fill nozzle, incorporating a pinch valve, that interacts with a sealable fill port that acts as a shut-off valve. The nozzle is part of a polymer delivery system and one of the fill ports is part of each individual mold. The fill nozzle valve is a compact pinch valve that uses a novel attachment between the valve sleeve and housing that does not obstruct flow through the sleeve or provide areas where fluid flow can stagnate, nor does it require protrusions on the outside of the housing.

The nozzle and port elements can be easily cleaned of waste polymer, the port being cleaned after each use with the nozzle being cleaned only periodically, to prevent introducing cured or otherwise degraded waste polymer into the mold. After removal, the nozzle can be attached to another mold and the original mold can be moved along a process line to another station. The system is readily adapted to automated filling of a casting mold. The coupling is especially useful on a mold that is to be filled from the bottom where the nozzle is removed without reorienting the mold. Another port of the same design can also be usefully combined with a disposable bent tube to form a vent and overfill coupling.

DETAILED DESCRIPTION OF THE ILLUSTRATED EMBODIMENTS

Figure 1:
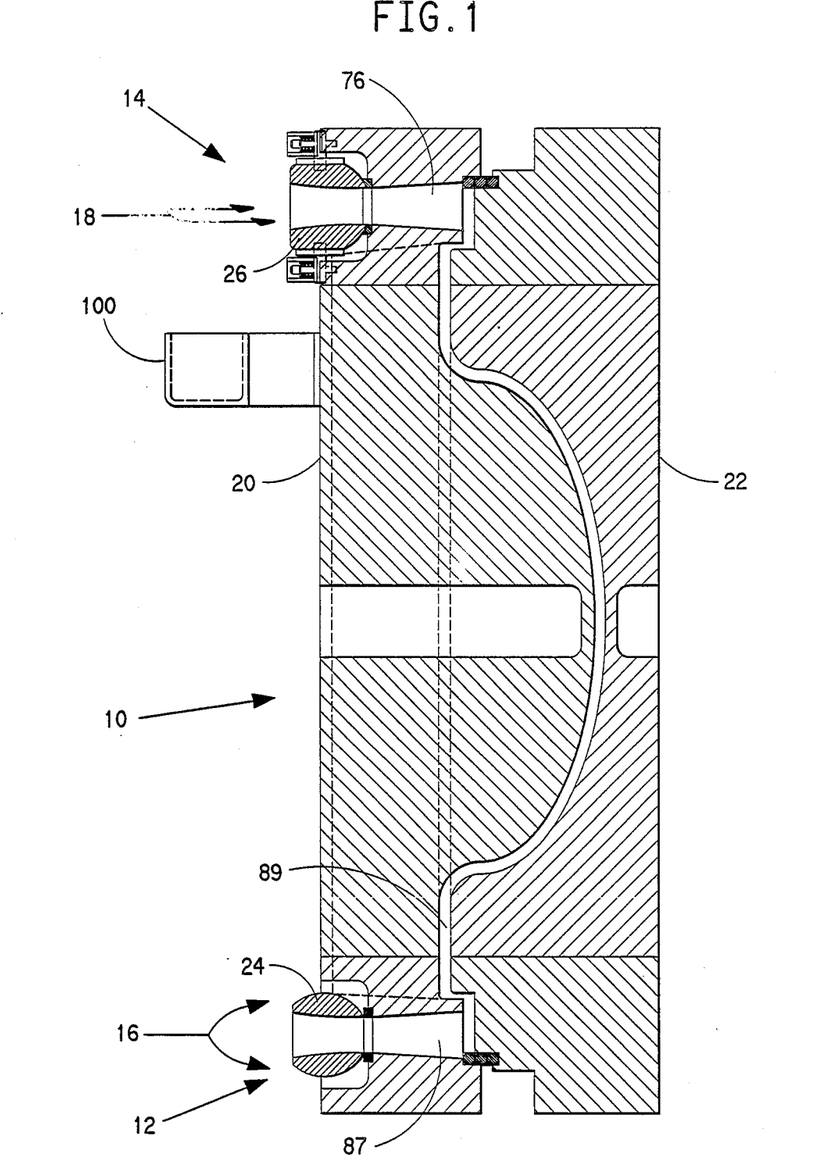
FIG. 1 is a side section of a mold oriented for bottom filling which incorporates the coupling of the invention.

FIG. 1 shows a pressurizable casting mold 10 having the sealable mold ports or shut-off valves, 12 and 14, of the invention. These ports are integral with the mold. The mold fills from the bottom via a fill port 12, and displaced air and polymer overfill flows out through the mold vent, or overfill, port 14 at the top of the mold. The fill and vent ports are made from spherical ball elements, 24 and 26 respectively, with pivot shafts attached to restrain the pivoting motion to a single plane. In FIG. 1, the fill port 12 pivots in a vertical plane 16, and the vent port 14 pivots in a horizontal plane 18; otherwise, both ports are the same. The mold may be adapted to permit movement of the male half 20 and female half 22 together to maintain good contact between the polymer and the mold surfaces when the polymer shrinks during cure.

Figure 4:
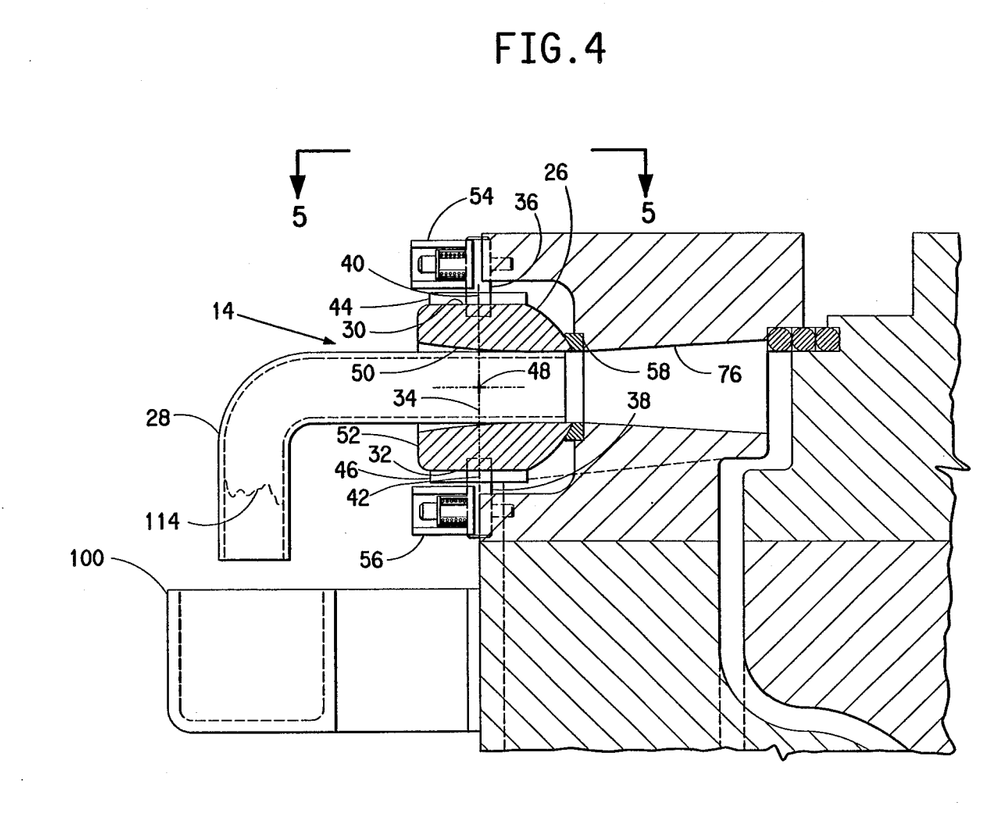
FIG. 4 is a view of a vent and overfill coupling.

The pivoting support of the ball elements can best be seen in FIG. 4 which is an enlarged view of the vent port 14 with a polymer overfill tube 28 inserted. The ball 26 has two flat sides, 30 and 32, perpendicular to the pivot axis 34 for mounting of pivot shafts 36 and 38. The axes, 40 and 42, of the pivot shafts are aligned along a common axis with each other, which defines the pivot axis 34. The shafts are attached to the ball at flanges 44 and 46 so their pivot axis passes through the rotational center 48 of the ball. The ball has a hole or passage 50 through the center and perpendicular to the pivot axis 34, and a flat surface 52 perpendicular to the hole on the side of the ball facing away from the mold. There are shaft restraining blocks 54 and 56 to hold the ball 26 in place against seal 58.

Figure 5:
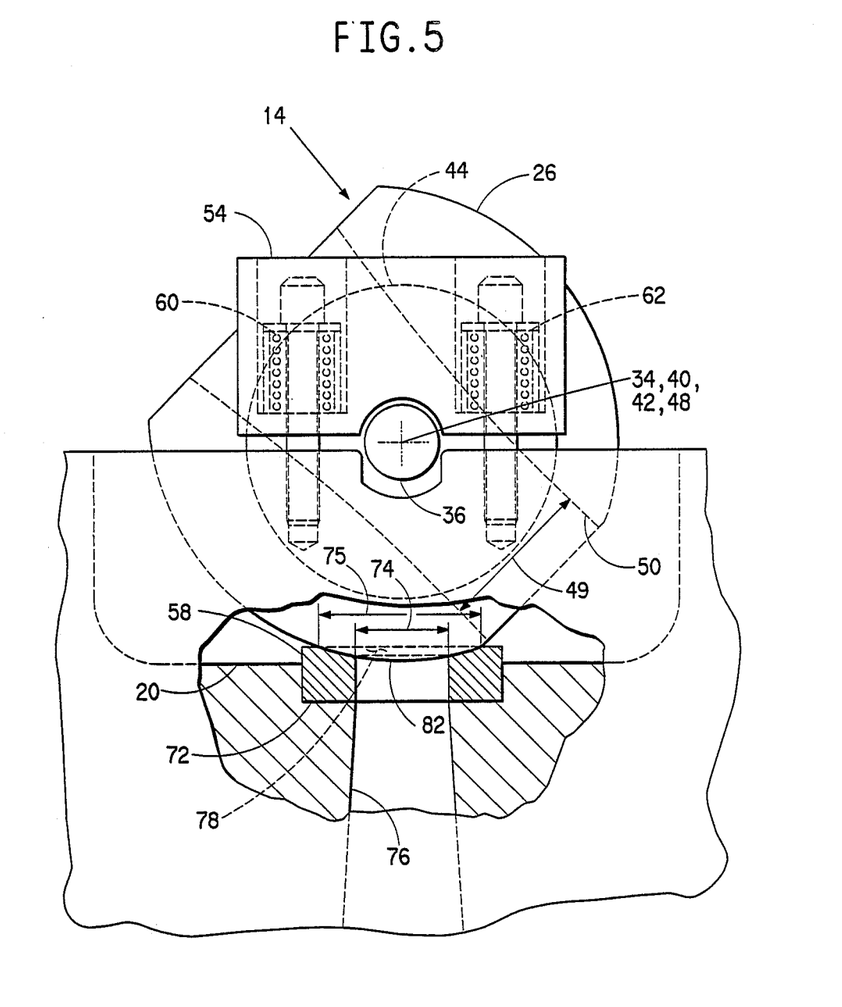
FIG. 5 is an enlarged view of the sealable port element or shut-off valve of the coupling of the invention.

FIG. 5 is view 5—5 of FIG. 4 and shows how two springs, 60 and 62, on each side of the ball act on restraining block 54 to push shaft 36 and attached ball 26 against the ball seal 58. As the ball and/or seal wear, the springs maintain a consistent sealing force since the shafts and ball are free to move toward the seal. The ball 26 and seal 58 are made of materials which will not stick to the cured polymer and do not require external lubrication to reduce the sliding friction between them. Both may be made of fluorocarbon resin such as polytetrafluoroethylene (PTFE), for instance, or the ball may be made of stainless steel coated with PTFE. The surface 82 of the ball is a surface of rotation with a center at 48 and a rotational center at pivot axis 34.

Figure 2:
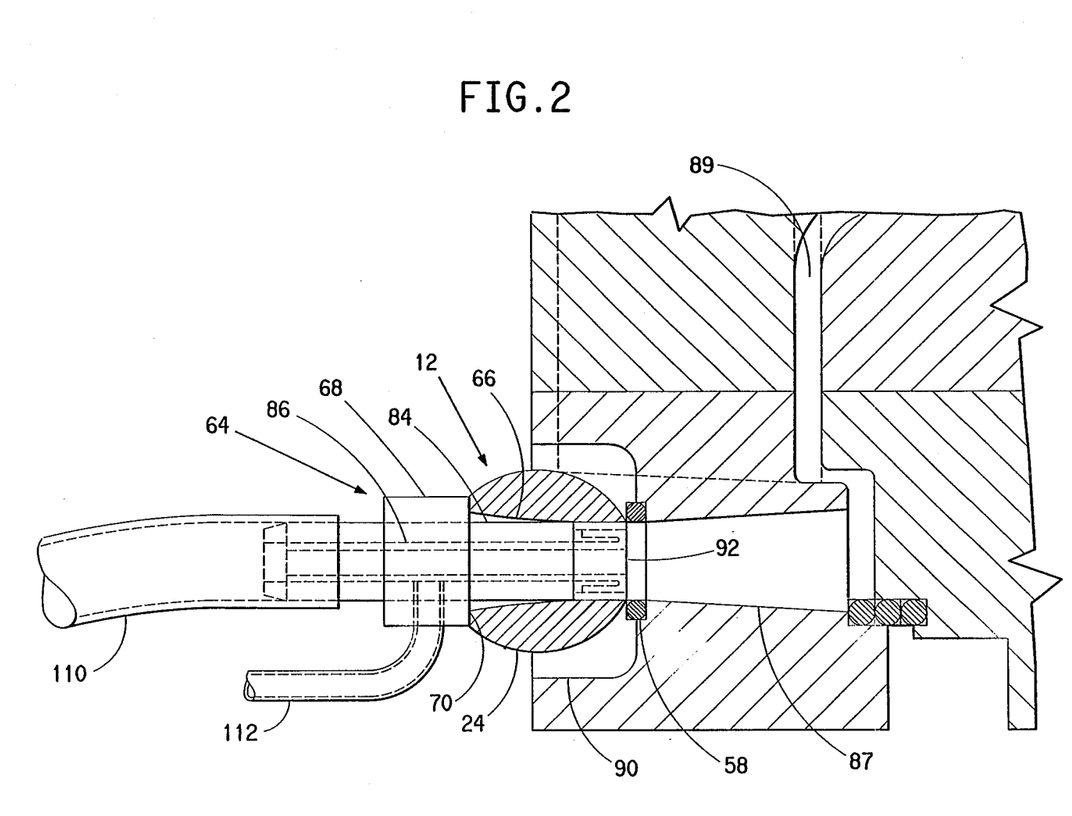
FIG. 2 is an enlarged section view of a mold fill coupling of the invention in an open fill position.

FIG. 2 shows a fill nozzle 64 inserted in hole 66 in the fill port 24. The hole diameter in the ball is a close fit with the outside diameter of the fill nozzle to limit the movement of pressurized polymer into the necessary clearance space between the nozzle and the port hole. If desired, an "O"-ring seal can be used between a collar 68, on the fill valve nozzle 64, and a flattened surface 70 surrounding the hole 66 to further restrict back flow of polymer out of the hole. Collar 68, abutting surface 70, also acts to locate the end 92 of nozzle 64 at the end of hole 66. This is important so the end of the nozzle is wiped clean when closing the port.

Referring to FIG. 5, the ball seal 58 is an annular washer of a low friction polymer, such as PTFE, which fits tightly in a counterbore 72 in the male mold half 20. The inner through hole 74 in the washer aligns with a channel 76 in the mold half 20 and is centered with respect to the shaft restraining blocks 54 and 56 (see FIG. 4). Springs 60 and 62 urge the ball against the washer, so a circular sealing contact area 78 is made between the annular inner through diameter 74 and the maximum inner diameter 75 of the washer and a portion of the spherical surface 82 of the ball. The surface of seal area 78 of the washer may be chamfered or spherically shaped so the maximum inner diameter 75 of the seal area is larger than the diameter 49 of hole 50. The washer hole 74 is slightly larger than the bore of sleeve 86 (FIG. 2). When the ball is rotated as shown in FIG. 5, a solid spherical surface 82 of the ball covers the hole 74 in the seal washer so the port is closed. When the ball is rotated so the hole 50 in the ball aligns with the hole 74 in the seal washer, the port is open.

Referring to FIG. 2, the nozzle 64 has an elongated tubular housing 84 that fits in the hole 66 of the fill port ball 24. The nozzle includes a pinch valve, primarily comprised of housing 84 and sleeve 86, which is a new, very compact design. Known commercial designs use an external flange or clamp to retain and seal a sleeve to the end of a housing (as in U.S. Pat. No. 3,982,723), or an internal circumferential ring is used for this purpose (as in U.S. Pat. No. 4,268,005). Both such designs require a larger cross-sectional thickness 85 (FIG. 6) to the valve annulus which is very undesirable in the system of the invention where the size of the nozzle valve is limited by the requirement that it be inserted into a passage in a sealable port. An improved design of the pinch valve of the invention will be described referring to FIG. 6. It uses a combination of adhesive and an external shrunken ring to retain and seal an overlapping flange on the sleeve to the housing at the exit end of the nozzle.

Figure 6:
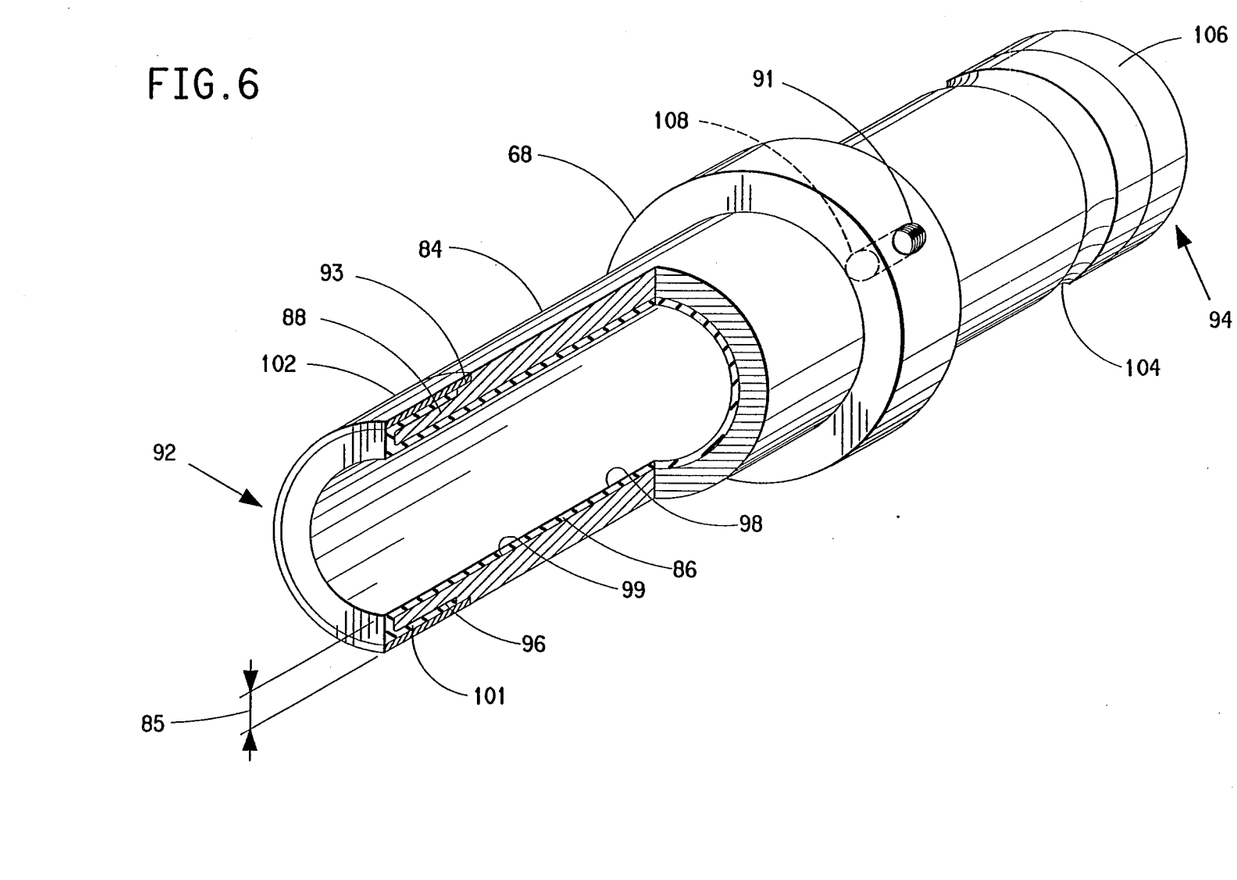
FIG. 6 is an isometric view of the novel pinch valve of the invention.
Figure 7:
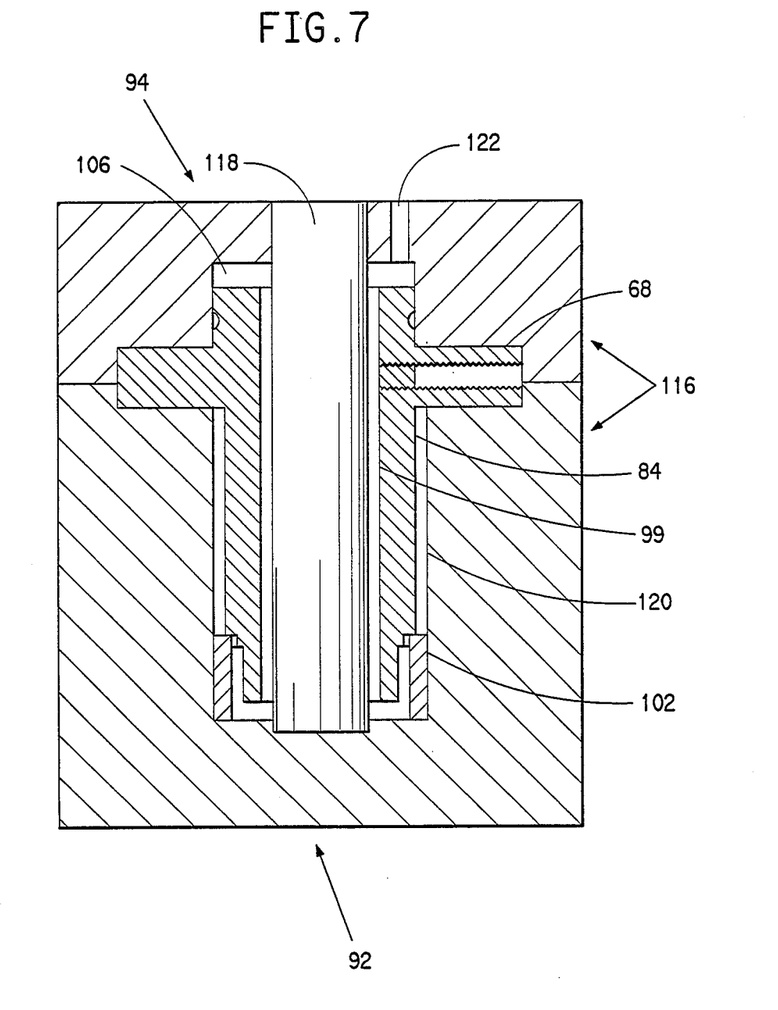
FIG. 7 is a diagramatic section view of the arrangement of parts for molding a pinch valve sleeve.

Referring to FIG. 6, the fill nozzle is made by first fabricating the cylindrical ring 102 and the cylindrical housing 84 with a cut back portion 88 on one end leading to a step 93, and with the collar 68 with fluid conduit 91 intermediate the ends. The ring is made of a high coefficient of expansion metal, such as aluminum, and the housing is a metal having a lower coefficient of expansion than the ring, such as stainless steel. Groove 104 may be used to aid in attaching and sealing conduit 110 (FIG. 2) to housing 84. The ends 92 and 94 of the housing are then dipped in an adhesive so the bore and outside circumference are coated for a short distance on the ends, as illustrated on end 92 at 96. On end 92, the adhesive is removed from the bore and on end 94 it is removed from the outside circumference. Referring to FIG. 7, the ring 102 and housing 84 are then placed in a mold body 116 and a cylindrical core rod 118 is supported in the center of the housing; the core rod diameter is equal to and defines the finished bore 98 of the sleeve 86 (FIG. 6). At the normal operating temperature for the pinch valve, the ring 102 and housing 84 are machined to be the same outside diameter, and the ring inner diameter is the same as or slightly less than the step outer diameter. Prior to molding, the ring, housing and mold are heated to an elevated temperature. The mold is sized so the hot expanded ring fits closely in cylindrical mold chamber 120. The lower coefficient of expansion housing 84 will fit loosely in the chamber (exaggerated in the figure), but is centered by a close fit with collar 68.

Putty-like, uncured rubber is injected in hole 122 and flows between the core rod 118 and housing bore 99 and is cured to form the sleeve. When injected, the rubber flows around the end of housing 92 and under expanded ring 102, thereby forming overlapping flange 101. A sleeve flange at the opposite housing end 94 is made by letting the rubber flow out of the bore 99 and around the end 94 of the housing to form the shoulder 106. When cured, the rubber is tightly bonded to the adhesive-coated ends of the housing. The heated mold, ring, housing, and rubber facilitate flowing and curing the rubber. When cooled, the ring 102 contracts more than the housing 84 so that a compressive pressure is applied to the rubber between the ring and the housing. The ring grips step 93 when fully contracted. The compressive force plus the adhesive positively secures the sleeve 86 at the end 92 of housing 84. If necessary, the ring outer diameter 102 can be machined after contracting to ensure a good match with the outer diameter of housing 84.

After curing and removal of the housing from the mold, the cured rubber between the adhesive coated ends can be easily separated from the housing when air pressure is applied through the fluid conduit 91. During molding, this fluid conduit 91 is plugged off where it intersects housing bore 99 at 108. This design results in a very compact pinch valve with a thin cross section 85.

The operation of the pinch valve will be described referring to FIG. 3. When fluid pressure, such as compressed air, is applied to the outside diameter of the sleeve 86 via conduit 91, the elastomeric sleeve 86 collapses inwardly as shown to shut off polymer flow from polymer conduit 110 through the nozzle. Since the sleeve is free to separate from the housing at end 92, the sleeve can pinch off polymer flow very near the end 92 which is desirable to prevent excess dripping of polymer. Any drip is easily disposed of. When fluid pressure is vented, the elastomeric sleeve 86 expands outwardly, with assistance from the pressurized polymer from conduit 110, and permits free passage of the polymer.

Figure 3:
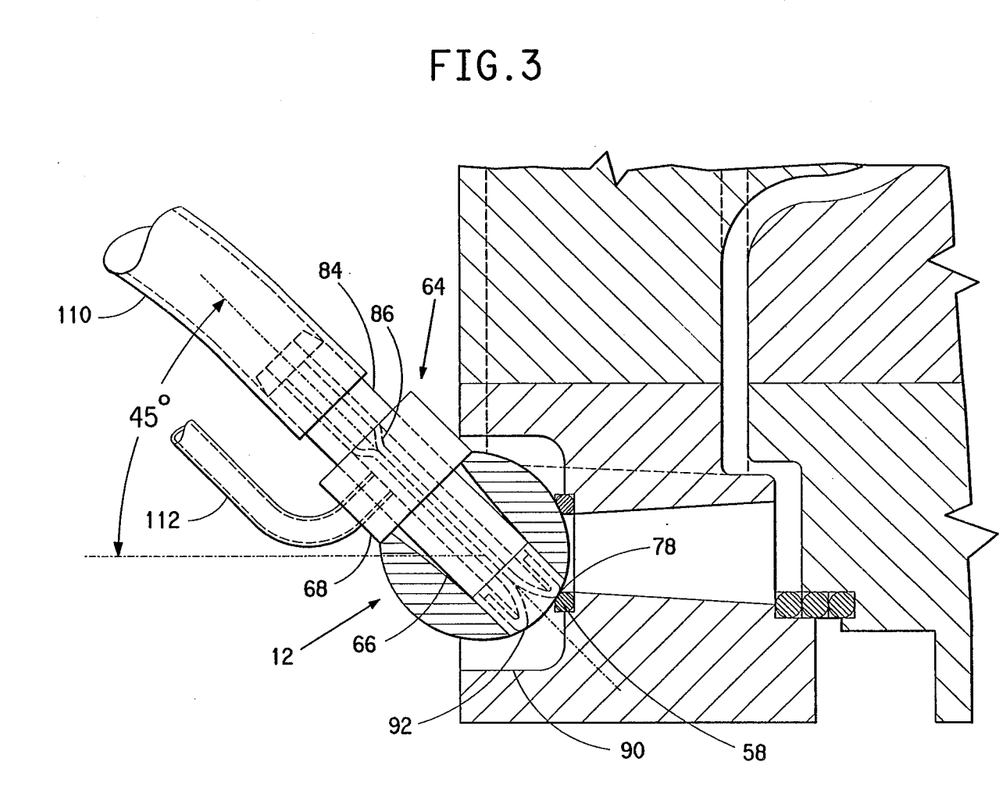
FIG. 3 is the view of FIG. 2 with the coupling shown in a closed position.

Referring to FIGS. 1, 2, and 3, the operation of the mold fill coupling is as follows:

the mold 10 as shown in FIG. 1 arrives at a fill station cleaned and ready to receive polymer;

the closed fill valve nozzle 64 is inserted into the hole 84 in ball 24 of fill port 12. Nozzle 64 is rotated if necessary so the ball hole is aligned with the seal washer hole to open the fill port;

the pinch valve in the fill valve nozzle is opened (FIG. 2);

the polymer flows through the fill valve nozzle 64, through the mold fill channel 87 and into the mold cavity 89; the polymer, upon filling upward through the mold, flows through the mold vent channel 76, and into the disposable overfill tube 28 (FIG. 4);

the polymer is detected in the transparent overfill tube at 114 by visual or automatic means and the pinch valve in the fill valve nozzle 64 is closed via pressurized fluid through connecting hose 112;

the conduit end of fill valve nozzle 64 is rotated upward 45 degrees thereby closing the sealable fill port 12 (FIG. 3). Rotation of the end 92 of the nozzle past the annular seal edge 78 wipes excess polymer from the nozzle so it is clean for insertion in the next mold (end 92 of the nozzle could also be spherically shaped to match the ball radius so more complete wiping could occur);

the fill valve nozzle 64 is withdrawn from the fill port 12. The 45 degree angled orientation of the fill port permits gravity flow of any viscous polymer residue from hole 66 in port 12 into cutout 90. Any minor dripping from the withdrawn nozzle falls away from the downwardly oriented end of the nozzle;

the overfill tube 28 is rotated sideways 45 degrees thereby closing the sealable vent port 14 and opening the other end of the disposable vent tube; the overfill polymer in the vent tube now siphons down into bucket 100; and the mold 10 is now filled and sealed so mold compression and polymer curing can go to completion.

After the part is cured in the mold, the fill and vent ports 12 and 14 are rotated to the open position to facilitate removal of the part and the fill and vent sprue from the mold. Any small amount of cured polymer flash in the bores 66 and 50 of the fill and vent ports can be easily removed since the bores are straight through with no shoulders or crevices. If necessary, the port balls can be easily removed for further cleaning or replacement. The ball seals 58 can also be readily removed for cleaning or replacement by disassembly of the retaining blocks. The outside diameter of the fill valve nozzle can also be readily cleaned as required. The straight bore 98 of the open nozzle valve sleeve 86 has no places for polymer to hang up, so only fresh polymer is dispensed with each mold fill.

Figure 8:
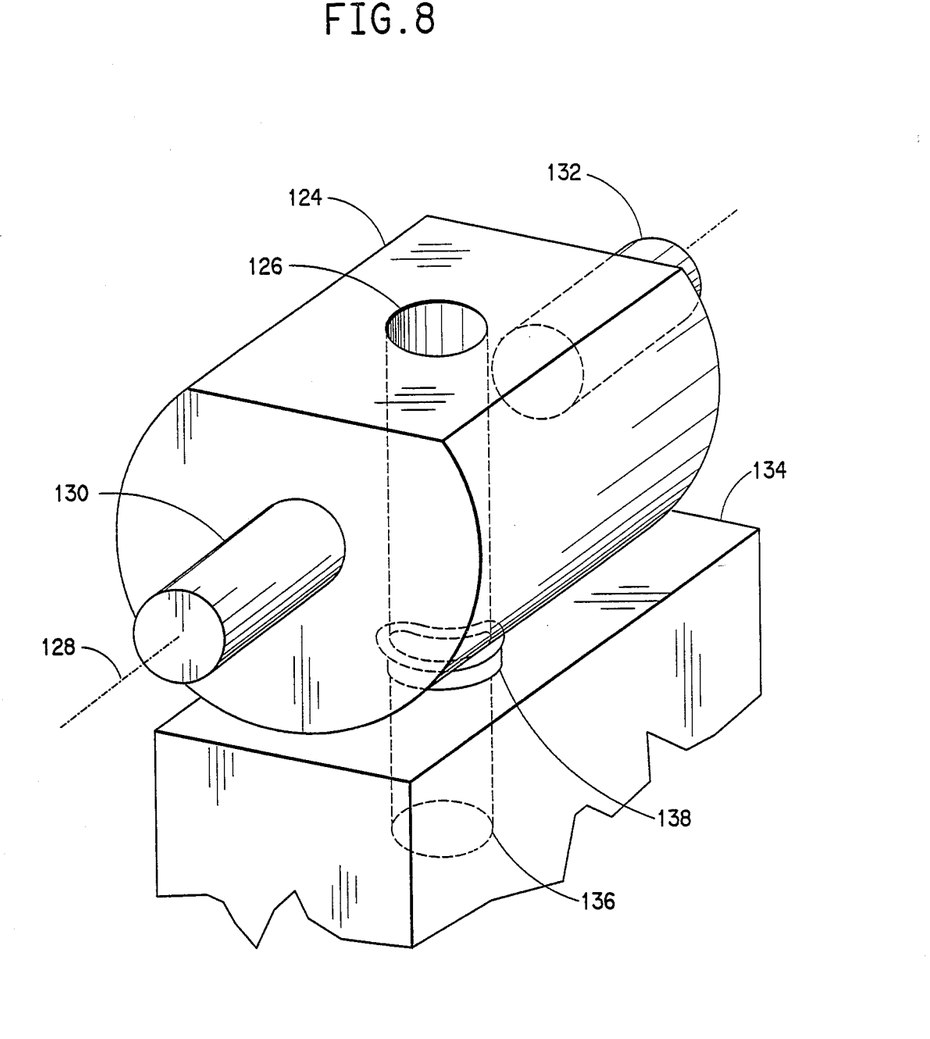
FIG. 8 is another embodiment of the invention showing a cylindrical shut-off valve.

Although the invention has been described with a spherical port element, a cylindrical element would work as well. FIG. 8 shows a cylindrical element 124 with a passage 126 and a rotational center 128 aligned with shafts 130 and 132. The cylindrical port element 124 is urged toward valve bOdy 134 in alignment with channel 136 by urging means not shown. Seal 138 is between the element and body and seals against both. The shape of the seal at the surface of the cylindrical element is saddle shaped to be in continuous contact with the cylindrical surface around the seal annulus. The relationship between the seal, passage and channel is similar to that discussed with respect to the spherical port element.

I claim:

1. A mold overfill coupling, comprising:
    a mold housing having a mold cavity and a overfill channel for fluid communication between the mold cavity and the outside of the housing;
    an annular seal surrounding the overfill channel at the outside of the housing;
    a spherical port element having a hole through the center establishing a port axis;
    means to urge the port element into the annular seal;
    means to support the port element for pivotal motion, about its center, the pivot axis perpendicular to the port axis so that the hole is aligned with the annulus of the seal in one pivotal position for receiving overfill from the mold, and is rotated beyond the annulus of the seal in another pivotal position for sealing the mold; and
    an elongated tube which is closely fitted in the hole in the port element and positioned so that the end of the tube extending into the hole is aligned with the end of the hole adjacent the seal to provide a close clearance wiping action with the seal as the tube and port element are pivoted together until the end of the hole and tube are beyond the seal.

* * * * *